US010444592B2

(12) United States Patent
Bouchard

(10) Patent No.: US 10,444,592 B2
(45) Date of Patent: Oct. 15, 2019

(54) METHODS AND SYSTEMS FOR TRANSFORMING RGB IMAGE DATA TO A REDUCED COLOR SET FOR ELECTRO-OPTIC DISPLAYS

(71) Applicant: E INK CORPORATION, Billerica, MA (US)

(72) Inventor: Alain Bouchard, Boston, MA (US)

(73) Assignee: E Ink Corporation, Billerica, MA (US)

( * ) Notice: Subject to any disclaimer, the term of this patent is extended or adjusted under 35 U.S.C. 154(b) by 49 days.

(21) Appl. No.: 15/916,569

(22) Filed: Mar. 9, 2018

(65) Prior Publication Data

US 2018/0259824 A1 Sep. 13, 2018

Related U.S. Application Data

(60) Provisional application No. 62/469,084, filed on Mar. 9, 2017.

(51) Int. Cl.

| | |
|---|---|
| ***G02F 1/167*** | (2019.01) |
| ***G09G 3/20*** | (2006.01) |
| ***G09G 3/34*** | (2006.01) |

(52) U.S. Cl.

CPC ........... *G02F 1/167* (2013.01); *G09G 3/2048* (2013.01); *G09G 3/344* (2013.01); *G09G 2310/068* (2013.01)

(58) Field of Classification Search

CPC ...... G02F 1/167; G09G 3/2048; G09G 3/344; G09G 2310/068

See application file for complete search history.

(56) References Cited

U.S. PATENT DOCUMENTS

| | | | | |
|---|---|---|---|---|
| 4,418,346 A | | 11/1983 | Batchelder | |
| 5,317,667 A | | 5/1994 | Weber | |
| 5,649,083 A | | 7/1997 | Barkans | |
| 5,760,761 A | | 6/1998 | Sheridon | |
| 5,777,782 A | | 7/1998 | Sheridon | |
| 5,808,783 A | | 9/1998 | Crowley | |
| 5,872,552 A | | 2/1999 | Gordon, II | |
| 5,880,857 A | | 3/1999 | Shiau | |
| 5,929,843 A | * | 7/1999 | Tanioka | G09G 3/3607 345/600 |
| 5,930,026 A | | 7/1999 | Jacobson | |
| 6,017,584 A | | 1/2000 | Albert | |
| 6,054,071 A | | 4/2000 | Mikkelsen, Jr. | |
| 6,055,091 A | | 4/2000 | Sheridon | |
| 6,097,531 A | | 8/2000 | Sheridon | |
| 6,128,124 A | | 10/2000 | Silverman | |
| 6,130,774 A | | 10/2000 | Albert | |
| 6,137,467 A | | 10/2000 | Sheridon | |
| 6,144,361 A | | 11/2000 | Gordon, II | |

(Continued)

OTHER PUBLICATIONS

Wood, D., "An Electrochromic Renaissance?" Information Display, 18(3), 24 (Mar. 2002) Mar. 1, 2002.

(Continued)

*Primary Examiner* — Dmitriy Bolotin
(74) *Attorney, Agent, or Firm* — Brian D. Bean

(57) ABSTRACT

A system for transforming RGB image data having at least 4 bits of data for each RGB color into image data suitable for display on an electro-optic display having pixels, wherein each pixel includes at least three non-white subpixels (of different colors) and a white subpixel.

20 Claims, 5 Drawing Sheets

(56) References Cited

U.S. PATENT DOCUMENTS

| | | | |
|---|---|---|---|
| 6,147,791 | A | 11/2000 | Sheridon |
| 6,172,798 | B1 | 1/2001 | Albert |
| 6,184,856 | B1 | 2/2001 | Gordon, II |
| 6,215,920 | B1 | 4/2001 | Whitehead |
| 6,225,971 | B1 | 5/2001 | Gordon, II |
| 6,241,921 | B1 | 6/2001 | Jacobson |
| 6,271,823 | B1 | 8/2001 | Gordon, II |
| 6,445,489 | B1 | 9/2002 | Jacobson |
| 6,504,524 | B1 | 1/2003 | Gates |
| 6,512,354 | B2 | 1/2003 | Jacobson |
| 6,531,997 | B1 | 3/2003 | Gates |
| 6,664,944 | B1 | 12/2003 | Albert |
| 6,672,921 | B1 | 1/2004 | Liang |
| 6,753,999 | B2 | 6/2004 | Zehner |
| 6,788,449 | B2 | 9/2004 | Liang |
| 6,825,970 | B2 | 11/2004 | Goenaga |
| 6,864,875 | B2 | 3/2005 | Drzaic |
| 6,866,760 | B2 | 3/2005 | Paolini, Jr. |
| 6,870,657 | B1 | 3/2005 | Fitzmaurice |
| 6,900,851 | B2 | 5/2005 | Morrison |
| 6,922,276 | B2 | 7/2005 | Zhang |
| 6,950,220 | B2 | 9/2005 | Abramson et al. |
| 6,982,178 | B2 | 1/2006 | LeCain et al. |
| 6,995,550 | B2 | 2/2006 | Jacobson |
| 7,002,728 | B2 | 2/2006 | Pullen |
| 7,012,600 | B2 | 3/2006 | Zehner |
| 7,023,420 | B2 | 4/2006 | Comiskey |
| 7,034,783 | B2 | 4/2006 | Gates |
| 7,075,502 | B1 | 7/2006 | Drzaic |
| 7,116,318 | B2 | 10/2006 | Amundson |
| 7,116,466 | B2 | 10/2006 | Whitesides |
| 7,119,772 | B2 | 10/2006 | Amundson |
| 7,167,155 | B1 | 1/2007 | Albert |
| 7,193,625 | B2 | 3/2007 | Danner |
| 7,202,847 | B2 | 4/2007 | Gates |
| 7,236,291 | B2 | 6/2007 | Kaga et al. |
| 7,259,744 | B2 | 8/2007 | Arango |
| 7,312,784 | B2 | 12/2007 | Baucom |
| 7,312,794 | B2 | 12/2007 | Zehner |
| 7,321,459 | B2 | 1/2008 | Masuda |
| 7,327,511 | B2 | 2/2008 | Whitesides |
| 7,339,715 | B2 | 3/2008 | Webber |
| 7,411,719 | B2 | 8/2008 | Paolini, Jr. |
| 7,420,549 | B2 | 9/2008 | Jacobson |
| 7,453,445 | B2 | 11/2008 | Amundson |
| 7,492,339 | B2 | 2/2009 | Amundson |
| 7,499,211 | B2 | 3/2009 | Suwabe |
| 7,528,822 | B2 | 5/2009 | Amundson |
| 7,535,624 | B2 | 5/2009 | Amundson et al. |
| 7,545,358 | B2 | 6/2009 | Gates |
| 7,583,251 | B2 | 9/2009 | Arango |
| 7,602,374 | B2 | 10/2009 | Zehner |
| 7,612,760 | B2 | 11/2009 | Kawai |
| 7,667,684 | B2 | 2/2010 | Jacobson |
| 7,679,599 | B2 | 3/2010 | Kawai |
| 7,679,814 | B2 | 3/2010 | Paolini, Jr. |
| 7,688,297 | B2 | 3/2010 | Zehner |
| 7,729,039 | B2 | 6/2010 | LeCain et al. |
| 7,733,311 | B2 | 6/2010 | Amundson |
| 7,733,335 | B2 | 6/2010 | Zehner |
| 7,787,169 | B2 | 8/2010 | Abramson et al. |
| 7,791,789 | B2 | 9/2010 | Albert |
| 7,839,564 | B2 | 11/2010 | Whitesides et al. |
| 7,848,009 | B2 | 12/2010 | Machida |
| 7,885,457 | B2 | 2/2011 | Hirano |
| 7,910,175 | B2 | 3/2011 | Webber |
| 7,952,557 | B2 | 5/2011 | Amundson |
| 7,952,790 | B2 | 5/2011 | Honeyman |
| 7,956,841 | B2 | 6/2011 | Albert |
| 7,999,787 | B2 | 8/2011 | Amundson |
| 8,009,348 | B2 | 8/2011 | Zehner |
| 8,023,176 | B2 | 9/2011 | Akashi |
| 8,031,392 | B2 | 10/2011 | Hiji |
| 8,040,594 | B2 | 10/2011 | Paolini, Jr. |
| 8,054,526 | B2 | 11/2011 | Bouchard |
| 8,077,141 | B2 | 12/2011 | Duthaler |
| 8,098,418 | B2 | 1/2012 | Paolini, Jr. |
| 8,125,501 | B2 | 2/2012 | Amundson |
| 8,139,050 | B2 | 3/2012 | Jacobson |
| 8,174,490 | B2 | 5/2012 | Whitesides |
| 8,174,491 | B2 | 5/2012 | Machida |
| 8,213,076 | B2 | 7/2012 | Albert |
| 8,289,250 | B2 | 10/2012 | Zehner |
| 8,300,006 | B2 | 10/2012 | Zhou |
| 8,305,341 | B2 | 11/2012 | Arango |
| 8,314,784 | B2 | 11/2012 | Ohkami |
| 8,319,759 | B2 | 11/2012 | Jacobson |
| 8,363,299 | B2 | 1/2013 | Paolini, Jr. |
| 8,384,658 | B2 | 2/2013 | Albert |
| 8,441,714 | B2 | 5/2013 | Paolini, Jr. |
| 8,441,716 | B2 | 5/2013 | Paolini, Jr. |
| 8,466,852 | B2 | 6/2013 | Drzaic |
| 8,558,783 | B2 | 10/2013 | Wilcox |
| 8,558,785 | B2 | 10/2013 | Zehner |
| 8,576,470 | B2 | 11/2013 | Paolini, Jr. |
| 8,576,476 | B2 | 11/2013 | Telfer |
| 8,587,859 | B2 | 11/2013 | Kayashima |
| 8,593,396 | B2 | 11/2013 | Amundson |
| 8,593,721 | B2 | 11/2013 | Albert |
| 8,704,754 | B2 | 4/2014 | Machida |
| 8,730,216 | B2 | 5/2014 | Mizutani |
| 8,730,559 | B2 | 5/2014 | Akashi |
| 8,797,634 | B2 | 8/2014 | Paolini, Jr. |
| 8,830,559 | B2 | 9/2014 | Honeyman |
| 8,873,129 | B2 | 10/2014 | Paolini, Jr. |
| 8,902,153 | B2 | 12/2014 | Bouchard |
| 8,928,562 | B2 | 1/2015 | Gates |
| 9,152,005 | B2 | 10/2015 | Morikawa et al. |
| 9,170,467 | B2 | 10/2015 | Whitesides |
| 9,199,441 | B2 * | 12/2015 | Danner .................... G02F 1/167 |
| 9,230,492 | B2 | 1/2016 | Harrington |
| 9,293,511 | B2 | 3/2016 | Jacobson |
| 9,348,193 | B2 | 5/2016 | Hiji |
| 9,412,314 | B2 | 8/2016 | Amundson |
| 9,672,766 | B2 | 6/2017 | Sjodin |
| 9,697,778 | B2 * | 7/2017 | Telfer ..................... G09G 3/344 |
| 2003/0102858 | A1 | 6/2003 | Jacobson |
| 2005/0225563 | A1 * | 10/2005 | Brown Elliott .......... G09G 5/02 345/604 |
| 2005/0253777 | A1 | 11/2005 | Zehner |
| 2007/0091418 | A1 | 4/2007 | Danner |
| 2007/0103427 | A1 | 5/2007 | Zhou et al. |
| 2008/0024429 | A1 | 1/2008 | Zehner |
| 2008/0024482 | A1 | 1/2008 | Gates |
| 2008/0043318 | A1 | 2/2008 | Whitesides |
| 2008/0048970 | A1 | 2/2008 | Drzaic |
| 2008/0136774 | A1 | 6/2008 | Harris |
| 2008/0291129 | A1 | 11/2008 | Harris |
| 2009/0092325 | A1 * | 4/2009 | Brown Elliott .......... G09G 3/20 382/232 |
| 2009/0174651 | A1 | 7/2009 | Jacobson |
| 2009/0225398 | A1 | 9/2009 | Duthaler |
| 2009/0322721 | A1 | 12/2009 | Zehner |
| 2010/0156780 | A1 | 6/2010 | Jacobson |
| 2010/0220121 | A1 | 9/2010 | Zehner |
| 2010/0265561 | A1 | 10/2010 | Gates et al. |
| 2011/0175939 | A1 | 7/2011 | Moriyama |
| 2011/0193840 | A1 | 8/2011 | Amundson |
| 2011/0193841 | A1 | 8/2011 | Amundson |
| 2011/0199671 | A1 | 8/2011 | Amundson |
| 2011/0285746 | A1 * | 11/2011 | Swic ........................ G09G 5/02 345/597 |
| 2012/0293858 | A1 | 11/2012 | Telfer |
| 2012/0326957 | A1 | 12/2012 | Drzaic |
| 2013/0222884 | A1 | 8/2013 | Moriyama |
| 2013/0222886 | A1 | 8/2013 | Kawahara |
| 2013/0222887 | A1 | 8/2013 | Nakayama |
| 2013/0222888 | A1 | 8/2013 | Urano |
| 2013/0335457 | A1 * | 12/2013 | Yano .................... G09G 3/3208 345/690 |
| 2015/0144946 | A1 * | 5/2015 | Kusunoki ......... G02F 1/133621 257/43 |
| 2015/0213626 | A1 * | 7/2015 | Hekstra ................ H04N 1/6058 345/590 |

(56) References Cited

U.S. PATENT DOCUMENTS

| | | | | |
|---|---|---|---|---|
| 2016/0035292 A1* | 2/2016 | Lee | G09G 3/3648 | 345/694 |
| 2016/0091770 A1* | 3/2016 | Bouchard | G09G 3/2044 | 359/296 |
| 2016/0246155 A1 | 8/2016 | Loxley et al. | | |
| 2019/0005900 A1* | 1/2019 | Chen | G02F 1/13 | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, U. et al., "Nanomaterials-Based Electrochromics for Paper-Quality Displays", Adv. Mater, vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Mossman, M.A., et al., "A New Reflective Color Display Technique Based on Total Internal Reflection and Substractive Color Filtering", SID 01 Digest, 1054 (2001) Dec. 31, 2001.

* cited by examiner

METHODS AND SYSTEMS FOR TRANSFORMING RGB IMAGE DATA TO A REDUCED COLOR SET FOR ELECTRO-OPTIC DISPLAYS

RELATED APPLICATIONS

This application claims priority to U.S. Provisional Application No. 62/469,084, filed Mar. 9, 2017, which is incorporated by reference herein in its entirety.

BACKGROUND

Color emissive displays, such as cathode ray tubes and liquid crystal displays, typically comprise an array of red, green, and blue (RGB) pixels. By carefully controlling the ratio and intensity of the colored pixels it is possible to produce a huge gamut of colors. For example, a display having only red, green, and blue pixels can achieve so called "true color" with only 256 gray levels per pixel (8 bits per pixel, a.k.a. 24-bit RGB). Because this "true color" gamut includes over 16 million different color combinations, it is possible to reproduce nearly all of the colors that are perceived by the human eye in such a display. Accordingly, most digital images and video are now produced, saved, and shared in an RGB format that assumes 256 different shades for each RGB subpixel.

In the current state of the art, there exist several embodiments of color reflective displays that differ in their mechanism of producing color. Although such displays are capable of rendering multiple colors at every pixel location (for example, white, the three subtractive primary colors (cyan, magenta and yellow) and the three additive primary colors (red, green and blue), in the current state of the art they are not capable of rendering colors corresponding to 256 RGB levels at every pixel location. This is in contrast to a typical emissive display (such as a liquid crystal display or a display made using light-emitting diodes) that is capable of providing at least 256 different intensity levels in red, green and blue channels, for a total of $2^{24}$ different colors, at each pixel location.

When modern image data is transferred to a display platform that has lesser color capabilities, the colors in the image data must be mapped to the new color palette. For example, as shown in FIG. 1, the display platform may include a pixel (black box) including only a red, a white, a blue, and a green subpixel. For RGB→RGBW transformations, the easiest way to transform high-color-density RGB data is to compensate for the total color depth in the red, green, and blue pixels by increasing or decreasing the intensity of the white pixel, as shown in FIG. 2. This technique is known to produce satisfying colors, especially when each of the RGBW subpixels has more than two optical states. Greater details of this process can be found in U.S. Pat. No. 5,929,843, which is incorporated herein by reference in its entirety.

Nonetheless, some displays only provide two states for each pixel, i.e., "on" and "off," sometimes referred to as 1-bit per channel. When transforming modern color image data for a 1-bit RGBW display, the above process of compensating for the total color depth with the white pixel is unsatisfactory. In particular, the transformation illustrated in FIG. 2 results in only eight colors: black, white, red, green, blue, cyan, magenta, and yellow. This limited palette results in "washed out" images that are not pleasing to a viewer. Accordingly, there is need for an improved method for mapping modern image data for presentation on a display having RGBW subpixels, wherein each subpixel has only an "on" and an "off" state.

SUMMARY

The RGB→RGBW transformation described above results in only eight colors for a RGBW-subpixel reflective display when each subpixel has only an "on" and "off" state. However, it is possible to achieve 2×2×2×2=16 color states for such a system, as shown in FIG. 3. Furthermore, if each color combination shown in FIG. 3 is characterized, e.g., as shown in FIG. 4, the measurements can be incorporated into a look-up-table (LUT), which becomes the basis for an image transformation method and systems for displaying transformed image data.

Accordingly, in one aspect the invention is a system for displaying color images including an electro-optic display comprising a color filter array having pixels, wherein each pixel includes at least three non-white subpixels and a white subpixel, wherein each of the non-white subpixels has a different color, and wherein each of the subpixels has only an "on" state and an "off" state. The system includes a first storage medium configured to store 4-bit or greater RGB (red, green, blue) image data, a second storage medium configured to store a look-up-table that correlates each color of the RGB image data to a specific combination of the three non-white subpixels and the white subpixel (wherein the subpixels have only an "on" state and an "off" state), a processor, a third storage medium configured to store the specific combinations for the resized pixels; and an image driver configured to display the specific combinations for the resized data on the electro-optic display. The processor is configured to A) resize the 4-bit or greater RGB image data so that the complete image is mapped onto the pixels of the electro-optic display, thereby creating resized pixels, B) identify a color for each of the resized pixels, C) compare the identified color for each of the resized pixels to a look-up-table correlating 4-bit or greater RGB colors to specific combinations of the three non-white subpixels and the white subpixel (wherein the subpixels have only an "on" state and an "off" state), and D) assign a specific combination of the three non-white subpixels and the white subpixel to each resized pixel.

In some embodiments the look-up-table comprises spectrophotometric measurements of each combination of the three non-white subpixels and the white subpixel (wherein the subpixels have only an "on" state and an "off" state). The three non-white subpixels may comprise a red, a green, and a blue subpixel, or the three non-white subpixels comprise a cyan, a magenta, and a yellow subpixel. In some embodiments, an additional green subpixel may be added to the CMY subpixels, such that each pixel includes a cyan, magenta, yellow, green, and white subpixel. Additional subpixel colors may be added with a suitable adjustment to the look-up-table. Of course, other color sets could be used, if for example, a color gamut richer in purples was desired.

A system of the invention may include a variety of electro-optic displays. For example, the electro-optic display may be an electrophoretic display comprising charged particles that move in the presence of an electric field. Such an electrophoretic display may include a light-transmissive electrode layer, an active matrix of pixel electrodes, and an electrophoretic medium sandwiched between the light-transmissive electrode layer and the active matrix of pixel electrodes. In other embodiments, the electro-optic display may be a total internal reflection (TIR) display, for example including a TIR sheet including a planar surface and a non-planar surface, a transparent electrode, an active matrix of pixel electrodes spaced apart from the transparent electrode to form a gap, and electrophoretic particles in the gap, wherein the electrophoretic particles move in the presence of an electric field between the transparent electrode and the active matrix of pixel electrodes. In other embodiments, the electro-optic display may be a reflective liquid crystal display or a cholesteric liquid crystal display.

In some embodiments, the system will comprise a temperature sensor. In embodiments with a temperature sensor, the processor will be configured to receive a temperature reading from the temperature sensor and select a temperature dependent look-up-table for that temperature, wherein the temperature dependent look-up-table correlates each color of the RGB image data to a specific combination of the three non-white subpixels and the white subpixel (wherein the subpixels have only an "on" state and an "off" state).

In another aspect, the invention includes a method for transforming 4-bit or greater RGB (red, green, blue) image data for display onto an electro-optic display having pixels, wherein each pixel comprises at least three non-white subpixels and a white subpixel, wherein each of the three non-white subpixels has a different color, and wherein each of the subpixels has only an "on" state and an "off" state. The method includes the following steps: resizing the 4-bit or greater RGB image data so that the complete image is mapped onto the pixels of the electro-optic display, thereby creating resized pixels, identifying a color for each of the resized pixels, comparing the identified color for each of the resized pixels to a look-up-table correlating 4-bit or greater RGB colors to specific combinations of the three non-white subpixels and the white subpixel (wherein the subpixels have only an "on" state and an "off" state), assigning a specific combination of the three non-white subpixels and the white subpixel to each resized pixel; and displaying the assigned specific combinations for each resized pixel on the electro-optic display.

In some embodiments, the look-up-table comprises spectrophotometric measurements of each combination of the three non-white subpixels and the white subpixel (wherein the subpixels have only an "on" state and an "off" state).

In some embodiments, resizing the 4-bit or greater RGB image data comprises dividing the RGB image data into bins, where the number of bins is equal to the number of pixels in the electro-optic display. Furthermore, a color can be identified for each of the resized pixels by calculating a color average for the RGB image data in each bin.

In some embodiments, the look-up-table correlates each specific combination of the three non-white subpixels and the white subpixel (wherein the subpixels have only an "on" state and an "off" state) to a set of 8-bit or greater RGB colors.

In some embodiments, the method further includes receiving a measurement of ambient temperature and selecting a temperature-dependent look-up-table correlating to that temperature, wherein the temperature-dependent look-up-table correlates each color of the RGB image data to a specific combination of the three non-white subpixels and the white subpixel (wherein the subpixels have only an "on" state and an "off" state).

In some embodiments, the method also includes gamma correcting the resized pixels prior to assigning a specific combination of the three non-white subpixels and the white subpixel to each resized pixel. In other embodiments, the resized pixels can be sharpened using a Laplacian operator. In still other embodiments, the positions of the assigned specific combinations are dithered before displaying the assigned specific combinations for each resized pixel. The dithering may be completed using a Floyd-Steinberg routine or a blue noise mask algorithm.

DETAILED DESCRIPTION

Figure 1:
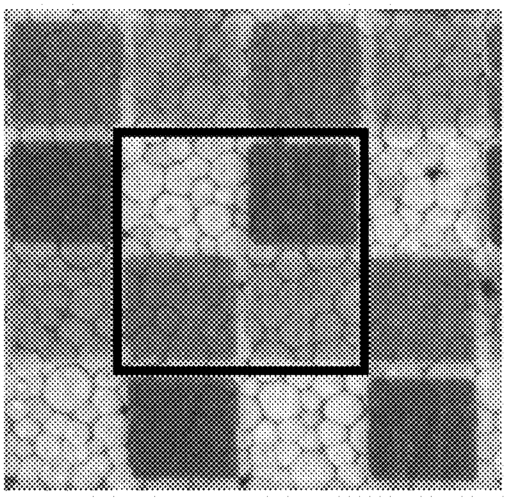
FIG. 1 is a microscope image of an electrophoretic display comprising pixels, where each pixel includes a red, green, blue, and white subpixel. The black square has been added to aid visualization of the pixel.

As described above, the invention includes systems and methods for transforming RGB image data having at least 4 bits of data for each color into image data suitable for display on an electro-optic display having pixels, wherein each pixel comprises at least three non-white subpixels and a white subpixel, wherein each of the three non-white subpixels has a different color, and wherein each of the subpixels has only an "on" state and an "off" state.

The systems and methods of the invention are generally applicable to electro-optic displays, particularly reflective electro-optic displays. For example, the electro-optic display may comprise an electrophoretic media including only two colors, e.g., black and white, with a color filter array film placed over the electrophoretic media. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface).

Displays with color filter arrays rely on area sharing and color blending to create color stimuli. The available display area is typically shared between three primary colors, such as red, green, and blue, and white (RGBW), however other primaries such as cyan, magenta, and yellow, may also be used with a white subpixel. The color filters can be arranged in one-dimensional (stripe) or two-dimensional (2×2) repeat patterns. Typically, the subpixels are chosen small enough so that at the intended viewing distance they visually blend together to a single pixel with a uniform color stimulus ('color blending').

In an electro-optic display with a CFA, colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered further by area-sharing with color pixels switched to black, i.e., resulting in a dark red, or dark green, or dark blue.

Figure 3:
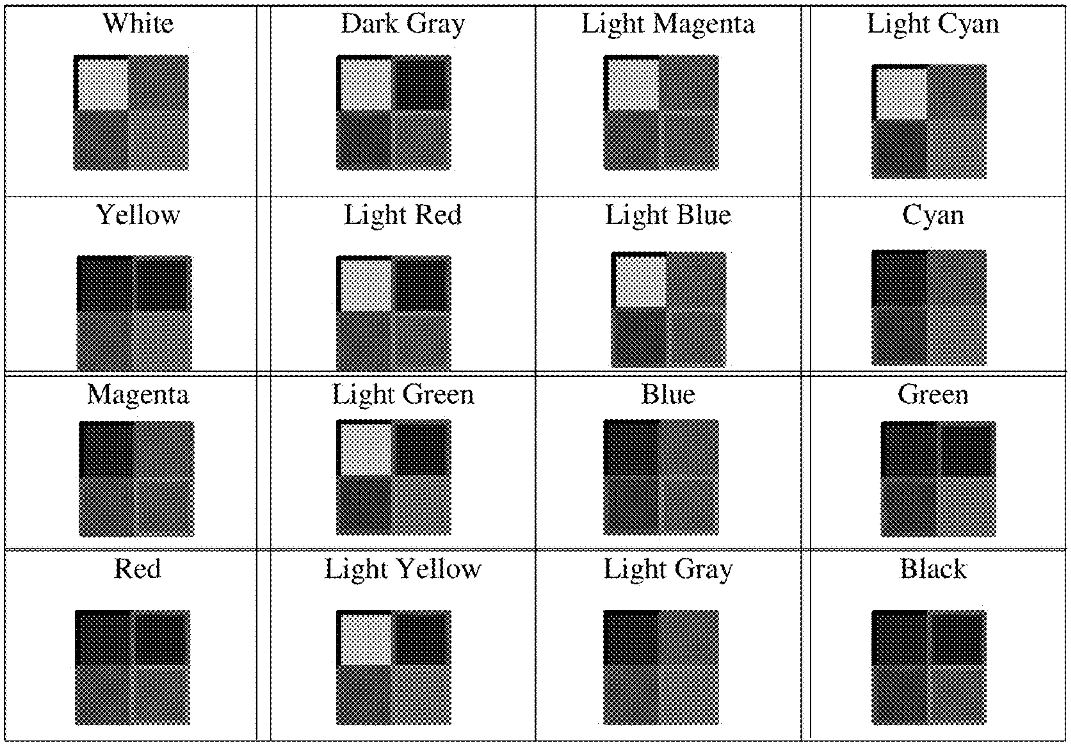
FIG. 3 illustrates the 16 individual subpixel color combinations available for an RGBW pixel when the subpixels have only an "on" and an "off" state.
Figure 5:
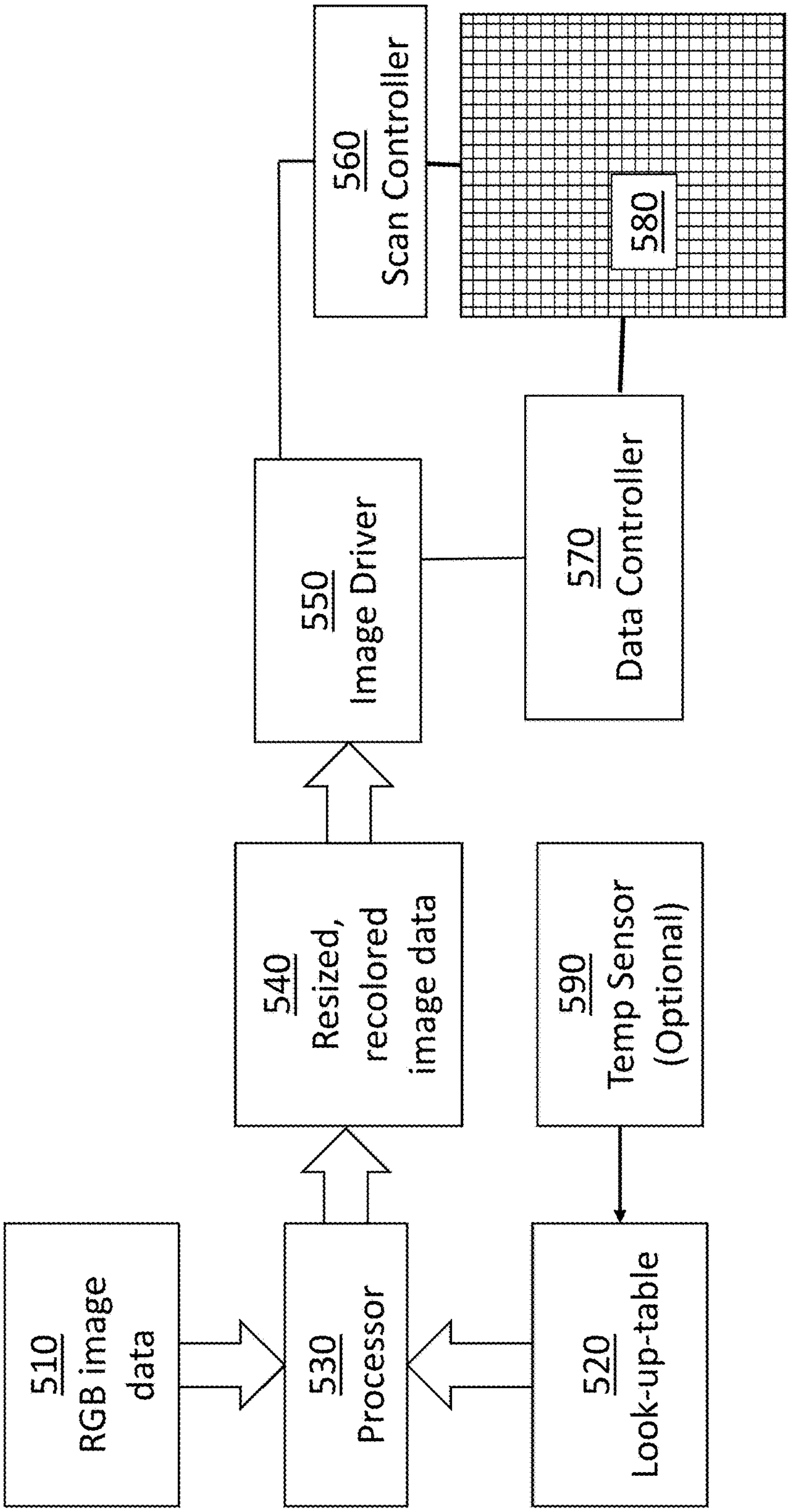
FIG. 5 depicts a system for displaying 4-bit or greater RGB image data on a display having a white subpixel and three non-white subpixels for each super pixel, wherein each subpixel has only an "on" and an "off" state.

An overview of a system of the invention is shown in FIG. 5. The system includes storage media, for example non-transitory memory, for example recordable magnetic media or random access memory that can store image data for some length of time. The image data typically includes a two dimensional image with colors assigned to specific locations in an x-y plane, i.e., pixels. Often the image data is in a raster format that identifies each pixel by a row and column location. In practice, the RGB image data may be in any of a number of compressed image formats such as jpeg, tiff, png, pdf, or some other format. It is understood that the compressed file may be uncompressed during the transformation. Where the RGB image data is described as including 4-bit or greater RGB colors, it is understood that the colors correspond to a gamut of at least 4096 colors, that is each red, green, or blue pixel is assumed to have 16 or more gray levels ($2^4=16$), i.e. 4-bits per channel. In some technical literature this may be referred to as 12-bit color ($2^{12}=4096$; 16×16×16=4096). The invention is not limited to 4-bit RGB color images, however. Suitable look-up-tables can be constructed for higher color levels, such as 5-, 6-, or 8-bit-per-channel colors. In particular, the invention is effective when each super pixel, e.g., as shown in FIG. 3, is associated with a range of colors from the 4096 (4-bit/channel) or 16,777,216 (8-bit/channel) color gamut. The invention is not limited to these color sets, however, as "deep color" images may also be converted using the systems and methods of the invention.

The RGB image data begins in a first storage medium 510 that is operatively coupled to a processor 530 so that the processor 530 can access the RGB image data. The processor 530 can be a specialty processor such as an i.MX 6 Series image processor from NXP Semiconductor (Eindhoven, The Netherlands) or the processor 530 can be a personal computer or other computing platform configured to resize, modify, and reassign pixel colors to the RGB image data. As part of the reassignment calculations, the processor 530 will access a look-up-table (LUT) 520 that correlates 4-bit or greater RGB colors to specific combinations of the at least three non-white subpixels and the white subpixel (wherein the subpixels have only an "on" state and an "off" state). The correlations are based upon actual measurements of the visible spectrum of each subpixel color set (described below).

Figure 6:
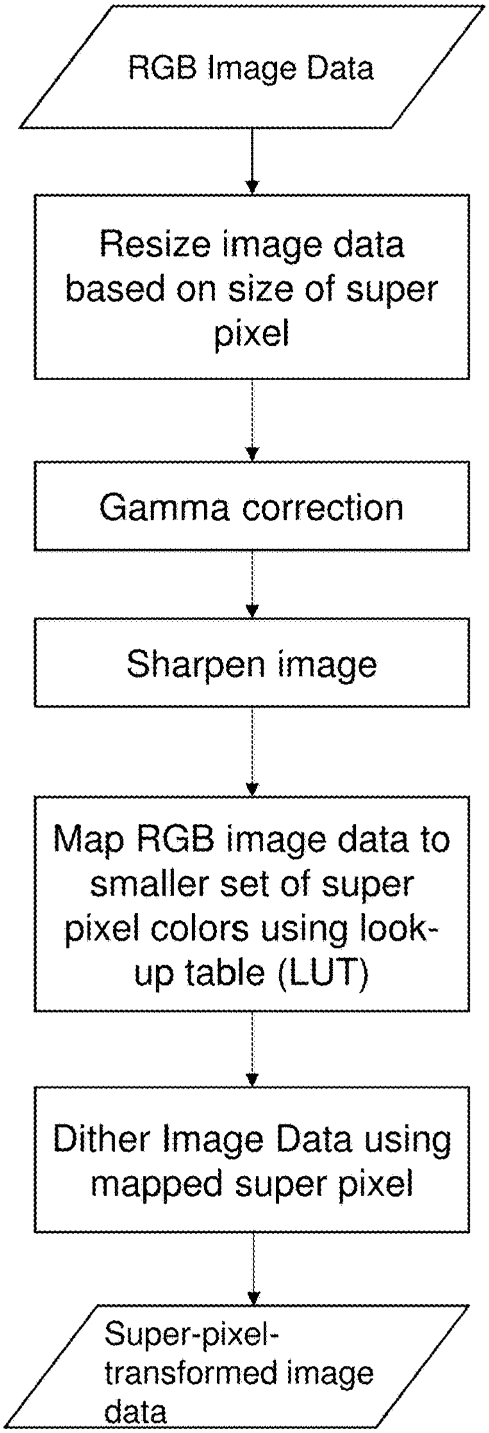
FIG. 6 depicts a method for transforming RGB image data for use with a display having a white subpixel and three non-white subpixels for each super pixel, wherein each subpixel has only an "on" and an "off" state.

The processor 530 will typically perform the transformation is a series of serial steps which are illustrated generally in FIG. 6. Upon receiving the RGB image data from the first storage medium 510, the processor will resize the image data based upon the size of the pixel of the display including at least three non-white subpixels and a white subpixel, wherein each of the three non-white subpixels has a different color, and wherein each of the subpixels has only an "on" state and an "off" state, i.e., as shown in FIG. 1. Where this pixel of at least three non-white subpixels and a white subpixel is larger in area than the underlying pixel electrodes that are driving the transition, this pixel may be referred to as a "super pixel." For example, the display medium beneath a color filter array may have 300 pixel electrodes per inch, however, each colored subpixel in the color filter array may actually only provide 40 super pixels per inch. Thus, "super pixel" should be interpreted as a subset of "pixel."

In most instances, the RGB image data will contain information for many more pixels that what can be shown on the display. Accordingly, a first step will be to resize the RGB image to conform to the number of available pixels/super pixels. Typically, this step involves binning portions of the RGB data into bins corresponding to the number and location of the super pixels. In some embodiments, the RGB colors of the binned data will be averaged to assign an RGB color to the binned data, or a median color can be identified among the resized RGB image data. The palette could be corrected for white point and black point if desired or distorted to handle color cast or shift. After resizing, the resized RGB data can be gamma corrected and/or sharpened using known techniques. For example the resized data can be sharpened with an algorithm using Laplacian operators. Once these steps are completed, the processor 530 will match the resized data color to the measured colors of the super pixels by comparing the colors of the resized data to the look-up-table 520. Using the look-up-table, the processor 530 assigns each unit of resized RGB data a color corresponding to a specific combination of the colored subpixels. For example, if the CFA had only red, green, blue, and white subpixels, the list of colors would be that shown in FIG. 3, e.g., white, dark gray, light magenta, light cyan, yellow, light red, light blue, cyan, magenta, light green, blue, green, red, light yellow, light gray, and black. Thus, if the look-up-table maps 4-bit RGB colors to the colors of FIG. 3, each of the 4096 RGB colors will be associated with one of the sixteen colors in FIG. 3. In other embodiments, the measured specific combinations are converted into L*a*b* data, which is then mapped into sRGB space using known algorithms.

Once the processor 530 has assigned specific combinations to the resized data, the data is written to a third storage medium 540 where it is held until it is sent to an image driver 550 that coordinates the activation of the various scanning and data lines that are ultimately responsible for switching the electro-optic pixels of an active matrix 580 from an "off" state to an "on" state to produce an image. While FIG. 5 shows an active matrix 580, it is understood that the principles of the invention can be used to transform colors for display on an electro-optic medium driven by segmented displays, indirectly drive displays, etc.

At the same time the processor 530 assigns new colors to the resized data, the processor 530 may also dither the resized data to improve the perception of the final image. Such dithering is well-known in the printing art. When a dithered image is viewed at a sufficient distance, the individual colored pixels are merged by the human visual system into perceived uniform colors. Because of the trade-off between color depth and spatial resolution, dithered images, when viewed closely, have a characteristic graininess as compared to images in which the color palette available at each pixel location has the same depth as that required to render images on the display as a whole. However, dithering reduces the presence of color-banding which is often more objectionable than graininess, especially when viewed at a distance.

Algorithms for assigning particular colors to particular pixels have been developed in order to avoid unpleasant patterns and textures in images rendered by dithering. Such algorithms may involve error diffusion, a technique in which error resulting from the difference between the color required at a certain pixel and the closest color in the per-pixel palette (i.e., the quantization residual) is distributed to neighboring pixels that have not yet been processed. European Patent No. 0677950 describes such techniques in detail, while U.S. Pat. No. 5,880,857 describes a metric for comparison of dithering techniques. U.S. Pat. No. 5,880,857 is incorporated herein by reference in its entirety.

When the device primary colors differ greatly from the target colors in the source space (such as the colors shown in Table 3), the following procedure may be used to render images on the display.

First, the L*a*b* (CIELAB 1978, D65/2) values are measured for each color. These L*a*b* values are converted to the sRGB (0-255) color space using a known transformation matrix. The result is a set of points that represents the actual device primary colors in sRGB space.

This set of points may be arbitrarily transformed in order to facilitate the dithering that is used to render the colored image. For example, the sRGB values of the measured primaries may be moved closer to the target points in the source space. The target image in the source space may also be transformed, for example by being linearly scaled to correspond to the measured black and white states of the display (i.e., each point in the image may be normalized to the measured dynamic range of the display). Following such transformations, the three-dimension color image dithering may be performed using algorithms that are known in the art, such as Floyd-Steinberg dithering. Other dithering techniques, such as blue-noise mask dithering may also be used.

Figure 4:
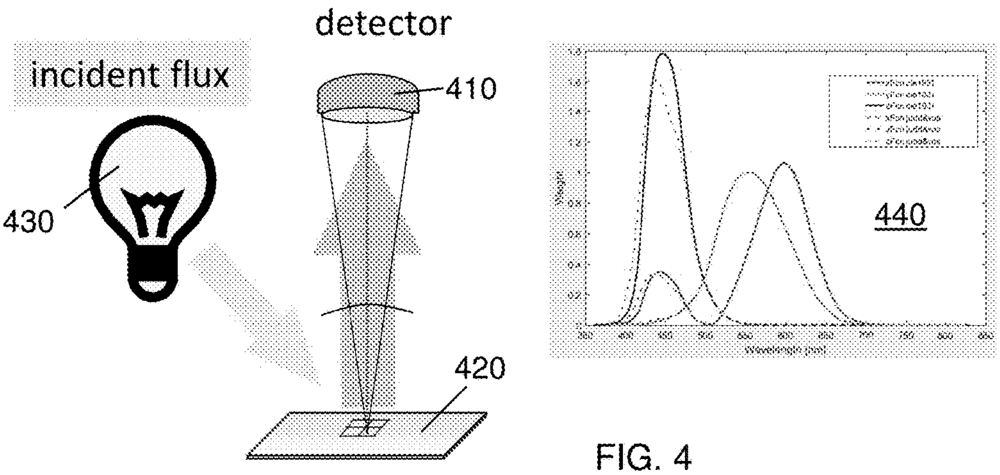
FIG. 4 depicts the techniques used to characterize the color of a specific combination of subpixels in an RGBW pixel, wherein each subpixel has only an "on" and an "off" state.

The look-up-table that is stored in the second storage medium 520 is created empirically as illustrated in FIG. 4. A spectrophotometric detector 410 is arranged above an optical bench on which a test display 420 has been arranged to be illuminated by a light source 430. The test display 420 corresponds to the type of electro-optic medium and color filter array that will be used in the system. The detector 410 may include optics (e.g., an iris) to allow the detector 410 to isolate the reflected color of a single super pixel. The test display 420 is then cycled through the various combinations of subpixels, e.g., as shown in FIG. 3. For each specific combination of subpixels, the detector 410 records a spectrum 440 which is then used for color mapping the RGB colors that are contained in the original RGB image data. Because there are far fewer specific combinations of subpixels than colors in the RGB image data, the look-up-table will typically include ranges or sets of RGB data that correspond to the specific combinations of subpixels. The test rig of FIG. 4 may also include a temperature-controlled stage in order to make spectrophotometric measurements at a variety of temperatures for the purpose of creating a temperature-dependent look-up-table.

Figure 2:
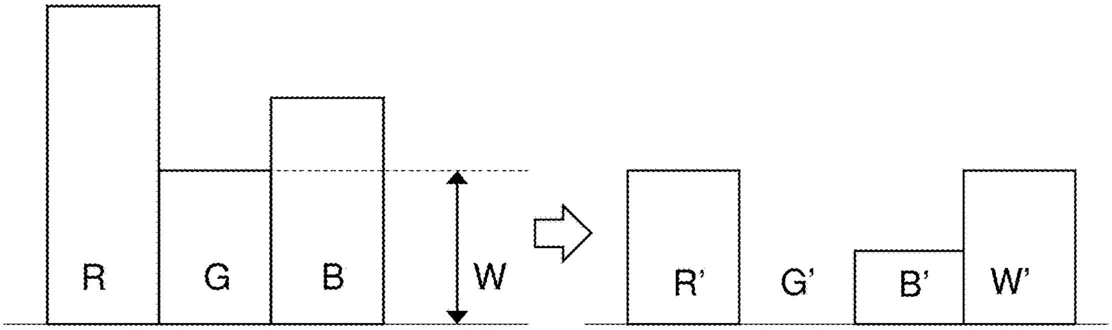
FIG. 2 (Prior Art)
FIG. 2 depicts prior art transformation of RGB image data into RGBW image data.
Figure 7:
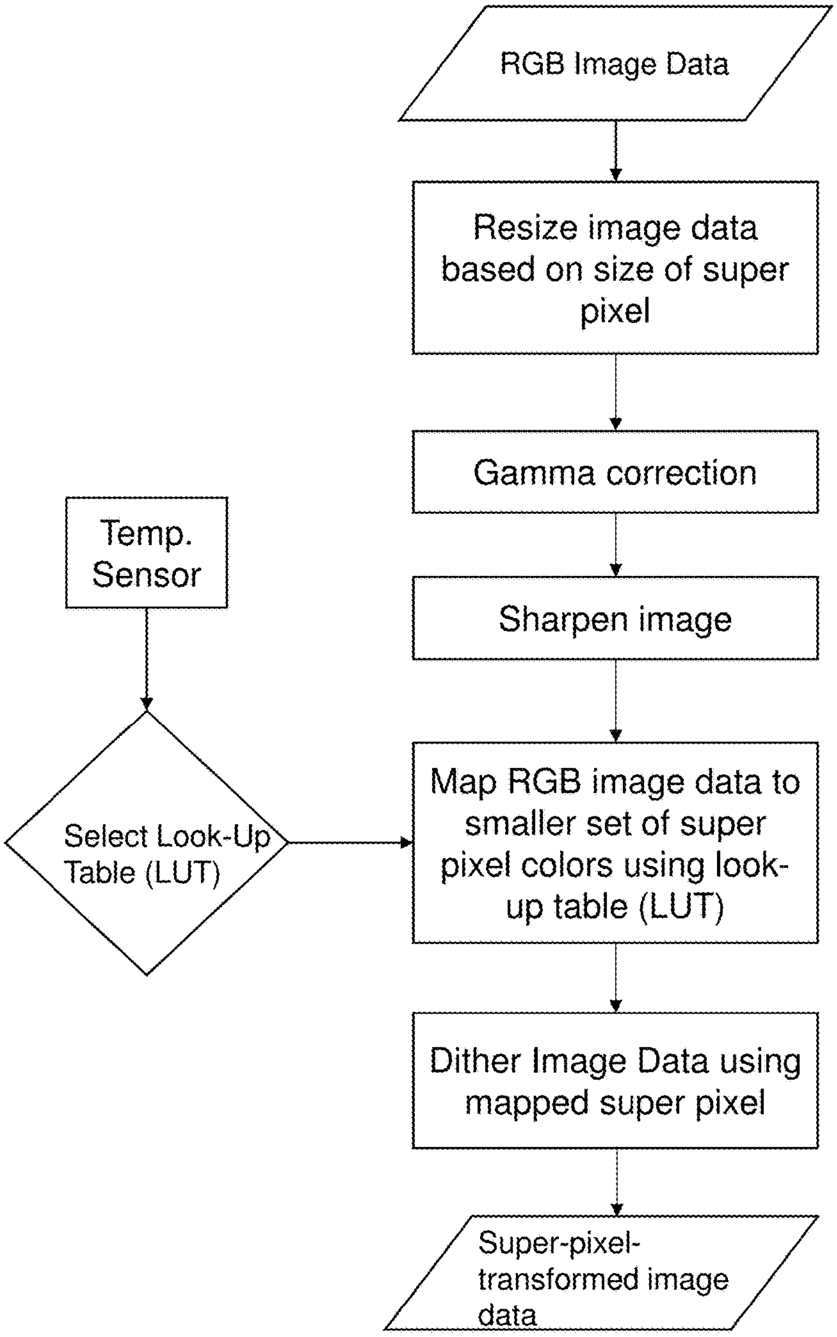
FIG. 7 depicts an alternate method for transforming RGB image data for use with a display having a white subpixel and three non-white subpixels for each super pixel, wherein each subpixel has only an "on" and an "off" state. In this alternate method, the look-up-table is specific for the measured temperature of the display.

It has been observed that the measured colors of the specific combinations of subpixels may vary with temperature. In the instance of an electro-optic display including an electrophoretic medium, the temperature variations may result from changes in the white state reflectivity with temperature. This shift may cause the look-up-table to require a different set of RGB colors to be associated with the specific combination of subpixel colors. Accordingly, the invention provides for an optional temperature sensor 590 that may be included in a system of the invention, as shown in FIG. 5. A temperature reading from the temperature sensor 590 may be the basis for selecting a temperature-dependent look-up-table, as shown in FIG. 7. In alternative embodiments, the electro-optic medium may be limited to a 1-bit subpixel color in some temperature regimes, but may allow higher color levels at other temperatures. In these embodiments, the look-up-table may be expanded based upon the temperature. For example, if an electrophoretic display has 2-bit subpixels at room temperature, but only 1-bit subpixels at high temperatures, the temperature data can cause a processor to switch from a look-up-table that maps 256 specific combinations of subpixel colors onto the RGB palette to a look up table described above, i.e., that maps 166 specific combinations of subpixel color onto the RGB palette. In still other embodiments, the temperature sensor may be used to switch between the standard RGB→RGBW transformation of FIG. 2 and a transformation of the invention, i.e., using a look-up-table based upon empirical measurements.

Other embodiments of the invention may use additional sensors such as a photodetector to measure the ambient light level incident on the system. As the incident light levels change, the color mapping may require adjustment for optimum viewing. This change may be incorporated into the look-up-table. In some embodiments, the system may include color sensitive photodetectors, thereby allowing the look-up-table to be indexed according to the spectrum of the incident light.

Overall the methods of the invention can be summarized in the below pseudo-code:

Pseudo-Code to Implement an Embodiment of the Invention

Inputs: Temperature, T; Lookup table, LUT; Input image, IM; Dithering Option, D; Output: Output image, OM

```
If T>Ta
        Select LUT for the range T>Ta
elseif Ta>T>Tb
        Select LUT for the range Ta>T>Tb
elseif Tb>T>Tc
        Select LUT for the range Tb>T>Tc
end if

Load input image (IM)
Resize input image based on the size of super pixel (IM_s)
Gamma correction (IM_sg)
Image sharpening using Laplacian Operator (IM_sgl)

If D==1
        Dither the sharpened image (IM_sgl) to the 16 color palette
        using 3D-Floyd-Steinberg routine and LUT (IM_sgld)
elseif D==2
        Dither the sharpened image to the 16 color palette using
        Blue-noise Mask and LUT (IM_sgld)
end if

Convert the dithered super pixel image (IM_sgld) to the original
resolution (IM_gld)
Generate the output image (OM) by converting 16 indexed image
to 1 bit image
Save the output image
```

The systems and techniques of the invention can be used with a variety of electro-optic displays. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Electrophoretic particles may also be employed to regulate total internal reflection. It has long been known that the transmission of light through an optical system can be modulated by causing the light to undergo total internal reflection at a surface within the system, and permitting or frustrating this total internal reflection by moving one or more members relative to the surface. The "members" moved relative to the surface can be electrophoretic particles suspended in a liquid and moved relative to the surface by an electric field. For example, U.S. Pat. No. 5,317,667, issued May 31, 1994, describes an electrophoretic switch for a light pipe. The light pipe is surrounded by two concentric cylindrical electrodes, the inner electrode being transparent. Between the electrodes is confined an electrophoretic medium comprising a plurality of charged particles in a suspending liquid. When the electrophoretic particles are spaced from the transparent inner electrode, total internal reflection (TIR) of the light passing along the light pipe occurs at this inner electrode, so that the full amount of light continues along the pipe. However, if an electric field is applied between the two electrodes so that the electrophoretic particles form a layer covering the inner electrode, TIR at this electrode is frustrated, and the flow of light along the pipe is substantially reduced or eliminated.

U.S. Pat. No. 6,215,920, issued Apr. 10, 2001 to Whitehead et al., describes a conceptually similar system (see FIG. 3 of the '920 patent) in which TIR occurs at the interface between a solid light-transmitting member and an electrophoretic medium. The light transmitting member has a series of parallel V-shaped grooves or channels having 90° internal angles and having surfaces covered with a transparent electrode material. The TIR system may alternatively include a series of hemispherical structures, such as seen in U.S. Patent Publication No. 2016/0246155, published Aug. 25, 2016. The opposed electrode has the form of a flat plate on the opposed side of a cavity within which the electrophoretic medium is confined. When the electrophoretic particles do not cover the surfaces of the channels, light enters through a planar surface of the light-transmitting member remote from the channels, strikes the surfaces of the channels, where it undergoes two TIR's, and is reflected back through the surface by which it entered. However, by applying an appropriate voltage between the electrodes, the electrophoretic particles are moved to form a layer plating the surfaces of the channels and frustrating the TIR's. Thus the apparatus acts as a light modulator. Mossman et al., "New Reflective Color Display Technique Based on Total Internal Reflection and Subtractive Color Filtering", SID 01 Digest, page 1054 (Society for Information Display, June 2001) describes a similar system in which the light-transmissive member includes an array of subtractive color filters to provide a full color display. The same paper also describes the use of a polymeric film adjacent the light-transmitting member, this polymeric film being provided with grooves having an internal angle of 60° and running perpendicular to the grooves in the light-transmitting member, in order to concentrate incoming light into the light-transmitting member.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;

(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; and 8,314,784; and U.S. Patent Applications Publication Nos. 2003/0102858; 2005/0122284; 2005/0179642; 2005/0253777; 2007/0091418; 2007/0103427; 2008/0024429; 2008/0024482; 2008/0136774; 2008/0150888; 2008/0291129; 2009/0174651; 2009/0179923; 2009/0195568; 2009/0322721; 2010/0045592; 2010/0220121; 2010/0220122; 2010/0265561; 2011/0187684; 2011/0193840; 2011/0193841; 2011/0199671; and 2011/0285754 (these patents and applications may hereinafter be referred to as the MEDEOD (MEthods for Driving Electro-optic Displays) applications);

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

The aforementioned U.S. Pat. No. 6,982,178 describes a method of assembling a solid electro-optic display (including an encapsulated electrophoretic display) which is well adapted for mass production. Essentially, this patent describes a so-called front plane laminate (FPL) which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as aluminized Mylar (Mylar is a Registered Trade Mark) from E. I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Patent Application Publication No. 2007/0031031 describes an image processing device for processing image data in order to display an image on a display medium in which each pixel is capable of displaying white, black and one other color. U.S. Patent Applications Publication Nos. 2008/0151355; 2010/0188732; and 2011/0279885 describe a color display in which mobile particles move through a porous structure. U.S. Patent Applications Publication Nos. 2008/0303779 and 2010/0020384 describe a display medium comprising first, second and third particles of differing colors. The first and second particles can form aggregates, and the smaller third particles can move through apertures left between the aggregated first and second particles. U.S. Patent Application Publication No. 2011/0134506 describes a display device including an electrophoretic display element including plural types of particles enclosed between a pair of substrates, at least one of the substrates being translucent and each of the respective plural types of particles being charged with the same polarity, differing in optical properties, and differing in either in migration speed and/or electric field threshold value for moving, a translucent display-side electrode provided at the substrate side where the translucent substrate is disposed, a first back-side electrode provided at the side of the other substrate, facing the display-side electrode, and a second back-side electrode provided at the side of the other substrate, facing the display-side electrode; and a voltage control section that controls the voltages applied to the display-side electrode, the first back-side electrode, and the second back-side electrode, such that the types of particles having the fastest migration speed from the plural types of particles, or the types of particles having the lowest threshold value from the plural types of particles, are moved, in sequence by each of the different types of particles, to the first back-side electrode or to the second back-side electrode, and then the particles that moved to the first back-side electrode are moved to the display-side electrode. U.S. Patent Applications Publication Nos. 2011/0175939; 2011/0298835; 2012/0327504; and 2012/0139966 describe color displays which rely upon aggregation of multiple particles and threshold voltages. U.S. Patent Application Publication No. 2013/0222884 describes an electrophoretic particle, which contains a colored particle containing a charged group-containing polymer and a coloring agent, and a branched silicone-based polymer being attached to the colored particle and containing, as copolymerization components, a reactive monomer and at least one monomer selected from a specific group of monomers. U.S. Patent Application Publication No. 2013/0222885 describes a dispersion liquid for an electrophoretic display containing a dispersion medium, a colored electrophoretic particle group dispersed in the dispersion medium and migrates in an electric field, a non-electrophoretic particle group which does not migrate and has a color different from that of the electrophoretic particle group, and a compound having a neutral polar group and a hydrophobic group, which is contained in the dispersion medium in a ratio of about 0.01 to about 1 mass % based on the entire dispersion liquid. U.S. Patent Application Publication No. 2013/0222886 describes a dispersion liquid for a display including floating particles containing: core particles including a colorant and a hydrophilic resin; and a shell covering a surface of each of the core particles and containing a hydrophobic resin with a difference in a solubility parameter of 7.95 $(J/cm^3)^{1/2}$ or more. U.S. Patent Applications Publication Nos. 2013/0222887 and 2013/0222888 describe an electrophoretic particle having specified chemical compositions. Finally, U.S. Patent Application Publication No. 2014/0104675 describes a particle dispersion including first and second colored particles that move in response to an electric field, and a dispersion medium, the second colored particles having a larger diameter than the first colored particles and the same charging characteristic as a charging characteristic of the first color particles, and in which the ratio (Cs/Cl) of the charge amount Cs of the first colored particles to the charge amount Cl of the second colored particles per unit area of the display is less than or equal to 5. Some of the aforementioned displays do provide full color but at the cost of requiring addressing methods that are long and cumbersome.

U.S. Patent Applications Publication Nos. describe an electrophoresis device including a plurality of first and second electrophoretic particles included in an insulating liquid, the first and second particles having different charging characteristics that are different from each other; the device further comprising a porous layer included in the insulating liquid and formed of a fibrous structure. These patent applications are not full color displays in the sense in which that term is used below.

See also U.S. Patent Application Publication No. 2011/0134506 and the aforementioned application Ser. No. 14/277,107; the latter describes a full color display using three different types of particles in a colored fluid, but the presence of the colored fluid limits the quality of the white state which can be achieved by the display.

The term "color" as used herein includes black and white. White particles are often of the light scattering type. Non-white colors are not white, however, they may include black. In some embodiments, the pixel of the display include at least three non-white and not-black subpixels as well as a white subpixel.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states Thus, the invention provides systems and methods for transforming RGB image data into a more limited color palette dictate by the subpixels in a color filter array. The invention also allows the specific transformations to be indexed according to operating temperature.

The invention claimed is:

1. A system for displaying color images comprising:

an electro-optic display comprising a color filter array having pixels, wherein each pixel includes at least three non-white subpixels and a white subpixel, wherein each of the at least three non-white subpixels has a different color, and wherein each of the subpixels has only an "on" state and an "off" state;

a first storage medium configured to store 4-bit or greater RGB (red, green, blue) image data;

a second storage medium configured to store a look-up-table that correlates each color of the RGB image data to a specific combination of the at least three non-white subpixels and the white subpixel, wherein the subpixels have only an "on" state and an "off" state;

a processor configured to:

A) resize the 4-bit or greater RGB image data so that the complete image is mapped onto the pixels of the electro-optic display, thereby creating resized pixels, B) identify a color for each of the resized pixels, C) compare the identified color for each of the resized pixels to a look-up-table correlating 4-bit or greater RGB colors to specific combinations of the at least three non-white subpixels and the white subpixel, wherein the subpixels have only an "on" state and an "off" state, and D) assign a specific combination of the at least three non-white subpixels and the white subpixel to each resized pixel;

a third storage medium configured to store the specific combinations for the resized pixels; and an image driver configured to display the specific combinations for the resized data on the electro-optic display.

2. The system of claim 1, wherein the look-up-table comprises spectrophotometric measurements of each combination of the at least three non-white subpixels and the white subpixel, wherein the subpixels have only an "on" state and an "off" state.

3. The system of claim 1, wherein the at least three non-white subpixels comprise a red, a green, and a blue subpixel.

4. The system of claim 1, wherein the at least three non-white subpixels comprise a cyan, a magenta, and a yellow subpixel.

5. The system of claim 4, further comprising a green subpixel.

6. The system of claim 1, wherein the electro-optic display is an electrophoretic display comprising charged particles that move in the presence of an electric field.

7. The system of claim 6, wherein the electrophoretic display comprises a light-transmissive electrode layer, an active matrix of pixel electrodes, and an electrophoretic medium sandwiched between the light-transmissive electrode layer and the active matrix of pixel electrodes.

8. The system of claim 1, wherein the electro-optic display is a total internal reflection (TIR) display.

9. The system of claim 8, wherein the TIR display comprises a TIR sheet including a planar surface and a non-planar surface, a transparent electrode, an active matrix of pixel electrodes spaced apart from the transparent electrode to form a gap, and electrophoretic particles in the gap, wherein the electrophoretic particles move in the presence of an electric field between the transparent electrode and the active matrix of pixel electrodes.

10. The system of claim 1, wherein the electro-optic display comprises reflective liquid crystals or cholesteric liquid crystals.

11. The system of claim 1, further comprising a temperature sensor, and wherein the processor is configured to receive a temperature reading from the temperature sensor and select a temperature dependent look-up-table for that temperature, wherein the temperature dependent look-up-table correlates each color of the RGB image data to a specific combination of the at least three non-white subpixels and the white subpixel, wherein the subpixels have only an "on" state and an "off" state.

12. A method for transforming 4-bit or greater RGB (red, green, blue) image data for display on an electro-optic display having pixels, each pixel comprising at least three non-white subpixels and a white subpixel, wherein each of the at least three non-white subpixels has a different color, and wherein each of the subpixels has only an "on" state and an "off" state, the method comprising:

resizing the 4-bit or greater RGB image data so that the complete image is mapped onto the pixels of the electro-optic display, thereby creating resized pixels;

identifying a color for each of the resized pixels;

comparing the identified color for each of the resized pixels to a look-up-table correlating 4-bit or greater RGB colors to specific combinations of the at least three non-white subpixels and the white subpixel, wherein the subpixels have only an "on" state and an "off" state;

assigning a specific combination of the at least three non-white subpixels and the white subpixel to each resized pixel; and displaying the assigned specific combinations for each resized pixel on the electro-optic display.

13. The method of claim 12, wherein the look-up-table comprises spectrophotometric measurements of each combination of the at least three non-white subpixels and the white subpixel, wherein the subpixels have only an "on" state and an "off" state.

14. The method of claim 12, wherein resizing the 4-bit or greater RGB image data comprises dividing the RGB image data into bins, where the number of bins is equal to the number of pixels in the electro-optic display.

15. The method of claim 14, wherein identifying a color for each of the resized pixels comprises calculating a color average for the RGB image data in each bin.

16. The method of claim 12, further comprising receiving a measurement of ambient temperature and selecting a temperature-dependent look-up-table correlating to that temperature, wherein the temperature-dependent look-up-table correlates each color of the RGB image data to a specific combination of the at least three non-white subpixels and the white subpixel, wherein the subpixels have only an “on” state and an “off” state.

17. The method of claim 12, further comprising gamma correcting the resized pixels prior to assigning a specific combination of the at least three non-white subpixels and the white subpixel to each resized pixel.

18. The method of claim 12, further comprising image sharpening the resized pixels using a Laplacian operator.

19. The method of claim 12, wherein displaying further comprises dithering the positions of the assigned specific combinations before displaying the assigned specific combinations for each resized pixel.

20. The method of claim 19, wherein dithering includes a color Floyd-Steinberg routine or a blue noise mask.

* * * * *